(12) United States Patent
McClanahan et al.

(10) Patent No.: US 9,069,779 B2
(45) Date of Patent: *Jun. 30, 2015

(54) OPEN FILE MIGRATION OPERATIONS IN A DISTRIBUTED FILE SYSTEM

(75) Inventors: Edward D. McClanahan, Pleasanton, CA (US); Ranji Balasubramanian, Campbell, CA (US); Borislav Marinov, Aliso Viejo, CA (US); Dilip Naik, Redmond, WA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2269 days.

This patent is subject to a terminal disclaimer.

(21) Appl. No.: 11/952,591

(22) Filed: Dec. 7, 2007

(65) Prior Publication Data

US 2009/0150449 A1    Jun. 11, 2009

(51) Int. Cl.
*G06F 17/30* (2006.01)
*H04L 29/08* (2006.01)

(52) U.S. Cl.
CPC .... *G06F 17/30079* (2013.01); *G06F 17/30153* (2013.01); *G06F 17/30156* (2013.01); *H04L 67/10* (2013.01)

(58) Field of Classification Search
CPC ............... G06F 17/30079; G06F 17/30088
USPC ............................................. 707/610, 640
See application file for complete search history.

(56) References Cited

U.S. PATENT DOCUMENTS

| | | | | |
|---|---|---|---|---|
| 5,832,522 A | * | 11/1998 | Blickenstaff et al. | 1/1 |
| 5,873,103 A | * | 2/1999 | Trede et al. | 1/1 |
| 6,269,382 B1 | * | 7/2001 | Cabrera et al. | 1/1 |
| 6,804,719 B1 | * | 10/2004 | Cabrera et al. | 709/226 |
| 7,165,059 B1 | * | 1/2007 | Shah et al. | 1/1 |
| 7,765,189 B2 | * | 7/2010 | Yamakawa | 707/640 |
| 7,921,267 B1 | * | 4/2011 | Yadav et al. | 711/162 |
| 2002/0069280 A1 | * | 6/2002 | Bolik et al. | 709/225 |
| 2004/0049513 A1 | * | 3/2004 | Yakir et al. | 707/100 |
| 2005/0015409 A1 | * | 1/2005 | Cheng et al. | 707/200 |
| 2005/0216532 A1 | * | 9/2005 | Lallier | 707/204 |
| 2006/0010154 A1 | * | 1/2006 | Prahlad et al. | 707/102 |
| 2006/0212481 A1 | * | 9/2006 | Stacey et al. | 707/104.1 |
| 2006/0212746 A1 | * | 9/2006 | Amegadzie et al. | 714/6 |
| 2008/0028007 A1 | * | 1/2008 | Ishii et al. | 707/204 |
| 2010/0106686 A1 | * | 4/2010 | Harvey et al. | 707/620 |

* cited by examiner

*Primary Examiner* — Miranda Huang
(74) *Attorney, Agent, or Firm* — Conley Rose, P.C.

(57) ABSTRACT

In at least some disclosed embodiments, a method includes a) creating a first stub file on a target file server, b) creating a t-stub file at the location of the source directory, c) disabling performance of operations on the source data while allowing completion of operations in progress, d) copying the source data into a hidden directory on the target file server, thus creating target data, e) overwriting the first stub file by renaming the target data, f) enabling performance of operations on the target data, g) performing queued operations on the target data, and h) deleting the source data from the source file server.

23 Claims, 11 Drawing Sheets

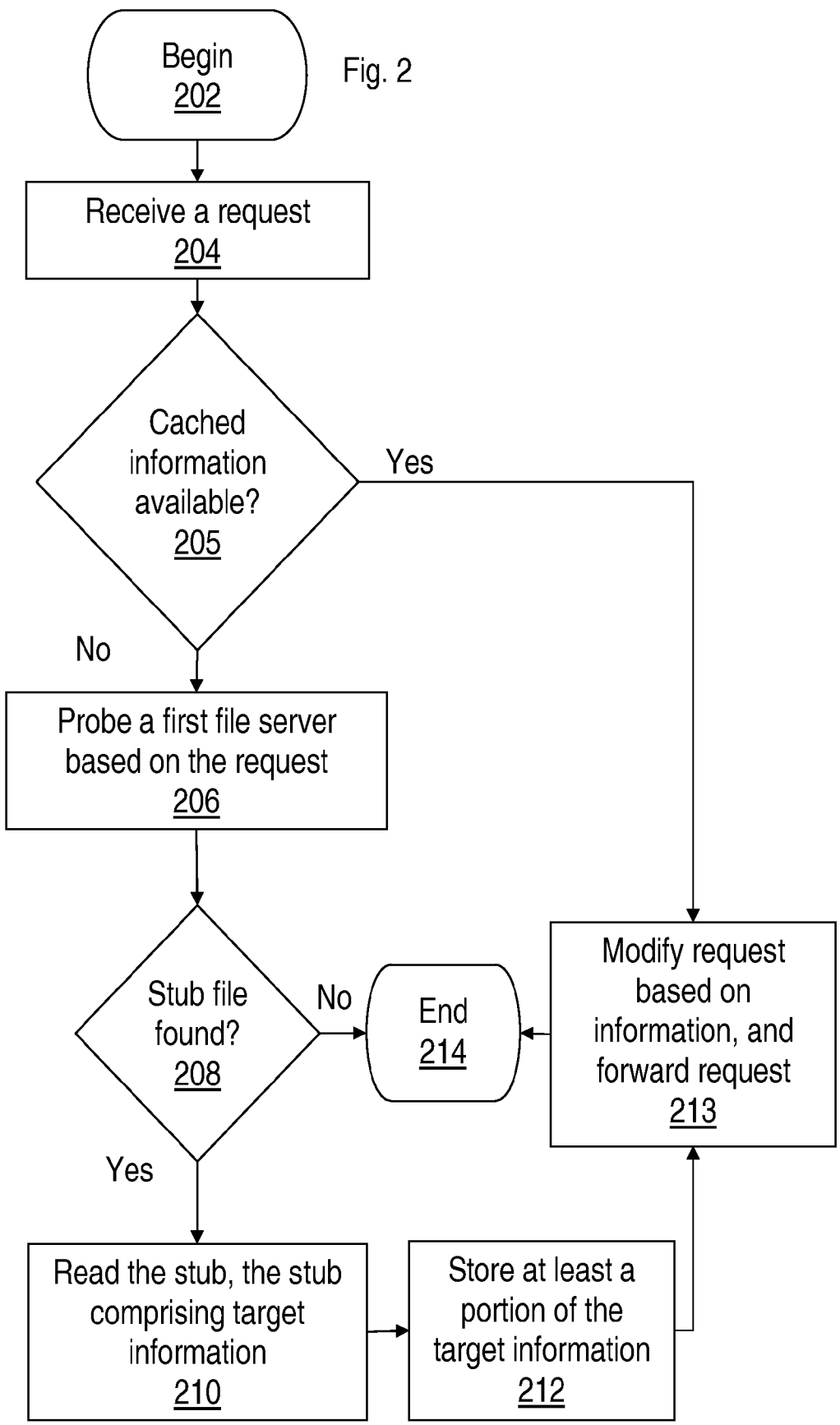

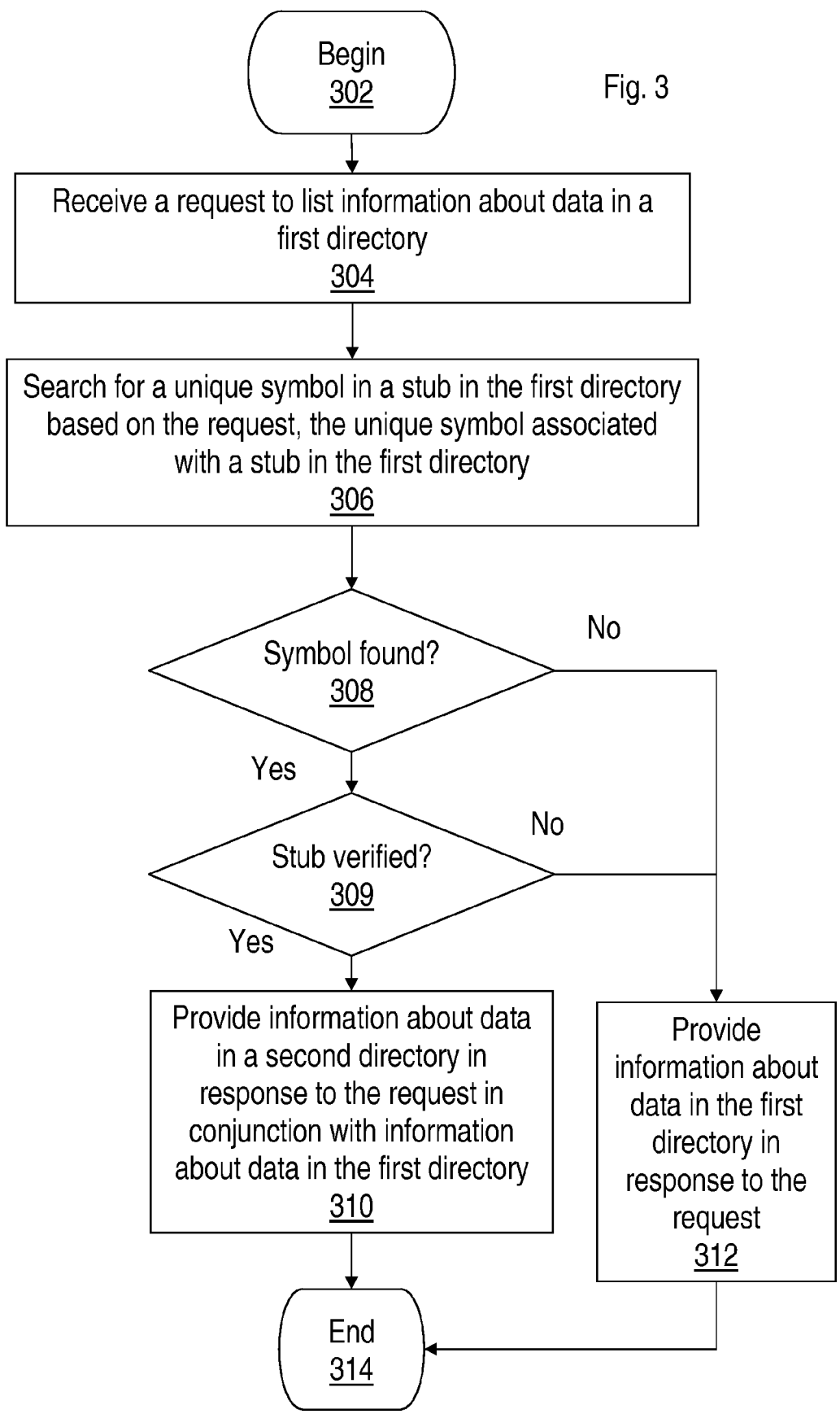

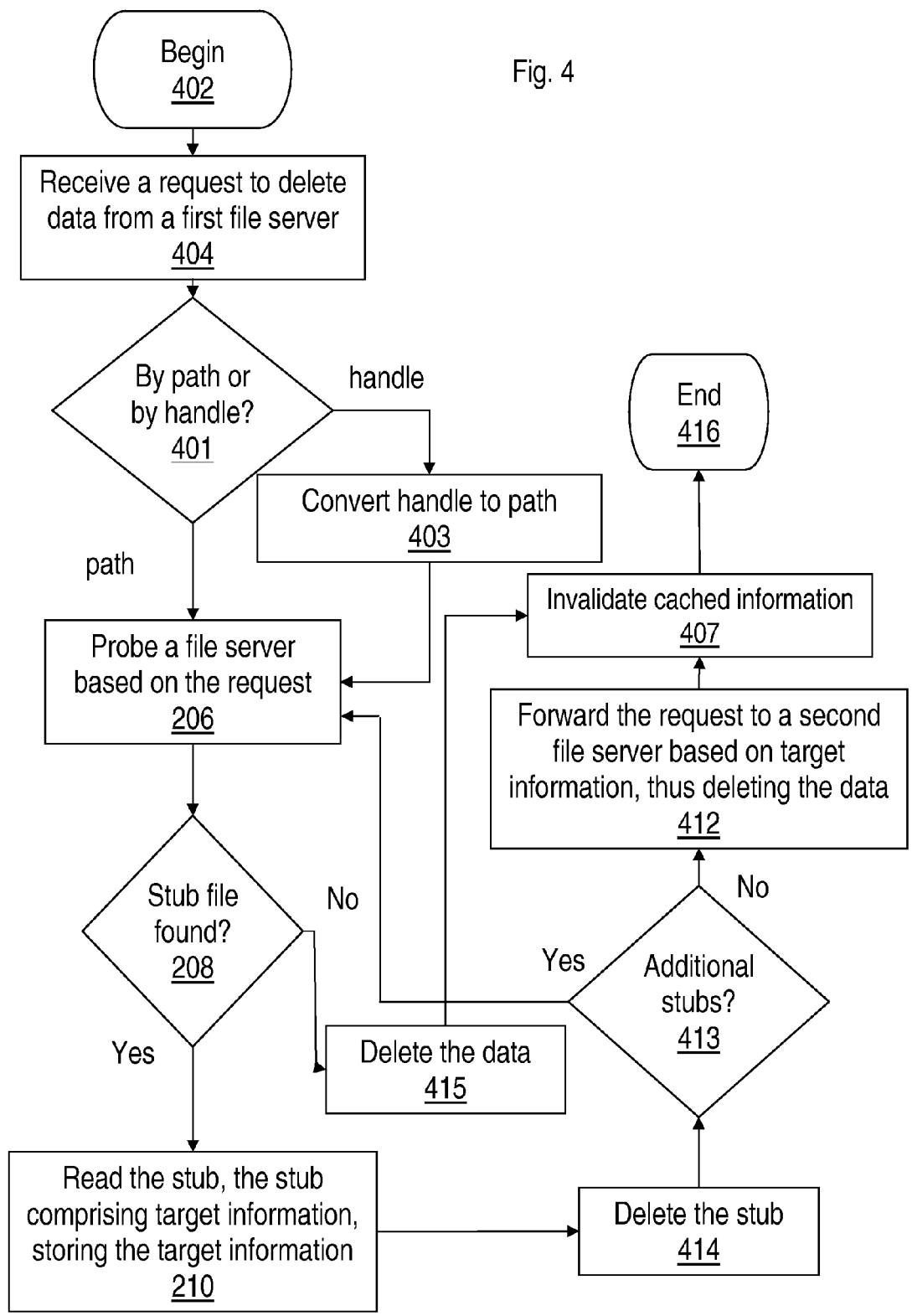

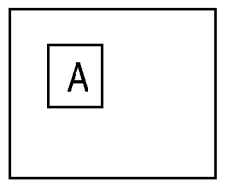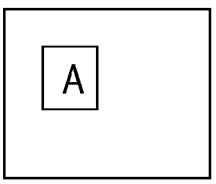
120 122 124 Fig. 5A
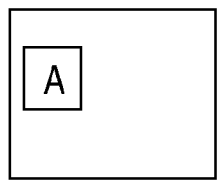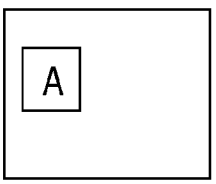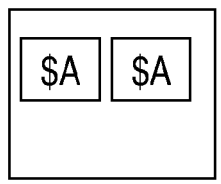
120 122 124 Fig. 5B
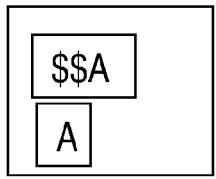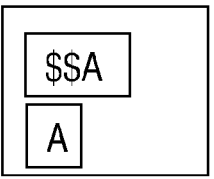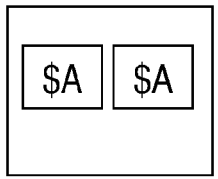
120 122 124 Fig. 5C
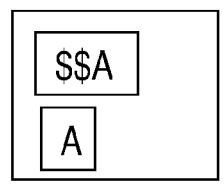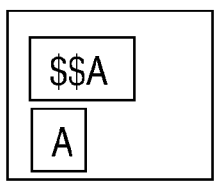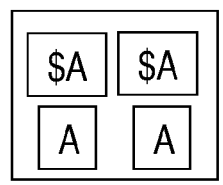
120 122 124 Fig. 5D
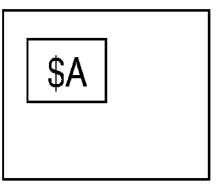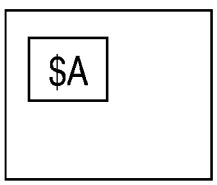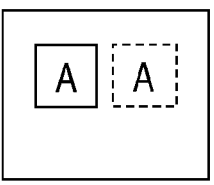
120 122 124 Fig. 5E

Fig. 6

- Begin 602
- Create a first stub in a target directory on a target server, the stub pointing to source data in a source directory on a source server 604
- If not already created, create a t-stub at the source directory, the t-stub pointing to the target directory, the source directory allowing access to source data when accessed due to the first stub 606
- Copy source data into a hidden directory on the target file server, thus creating target data 608
- Overwrite the stub by renaming the target data 610
- Delete the source data 612
- More source data? 614 — Yes (loop back to 604) / No
- End 616

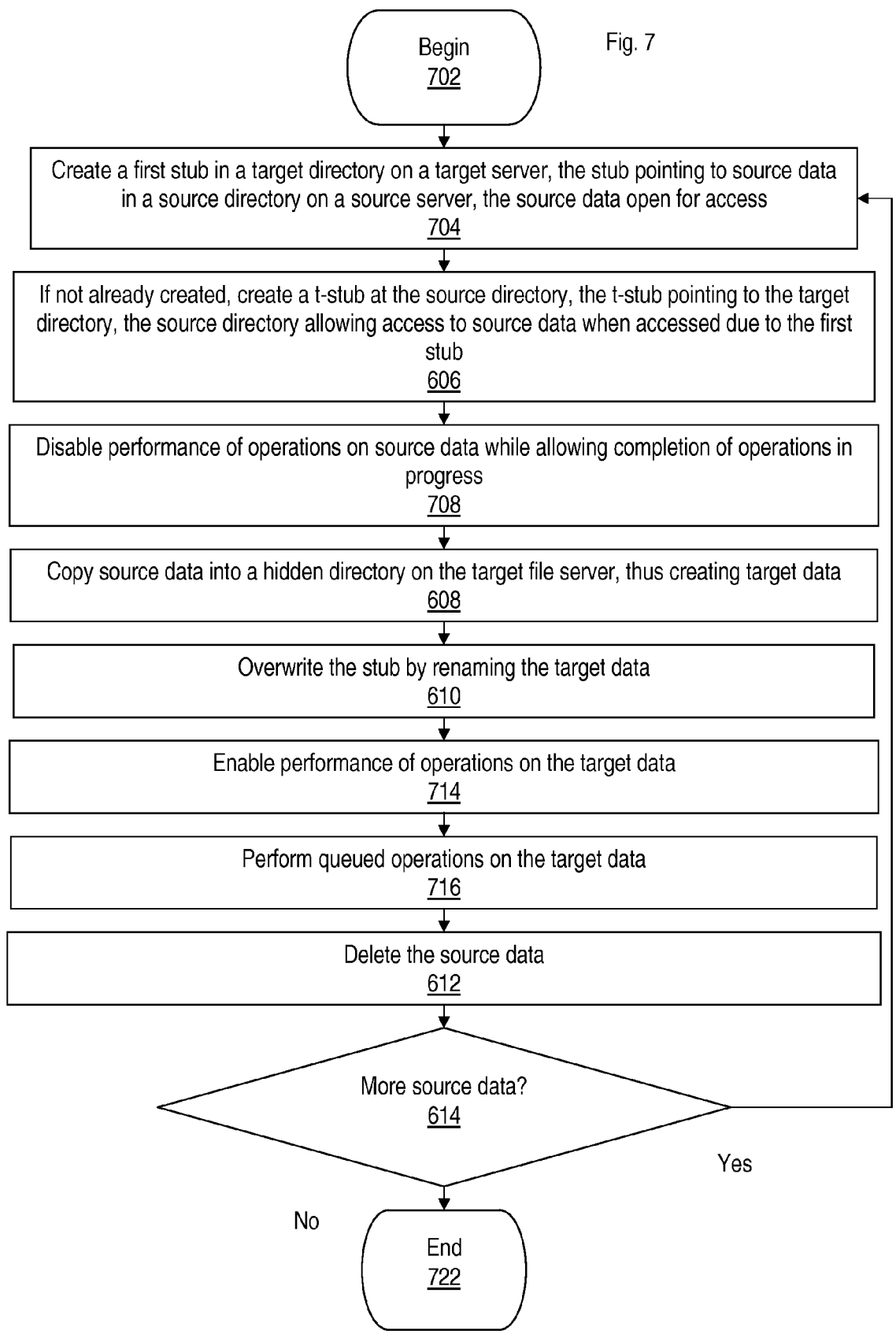

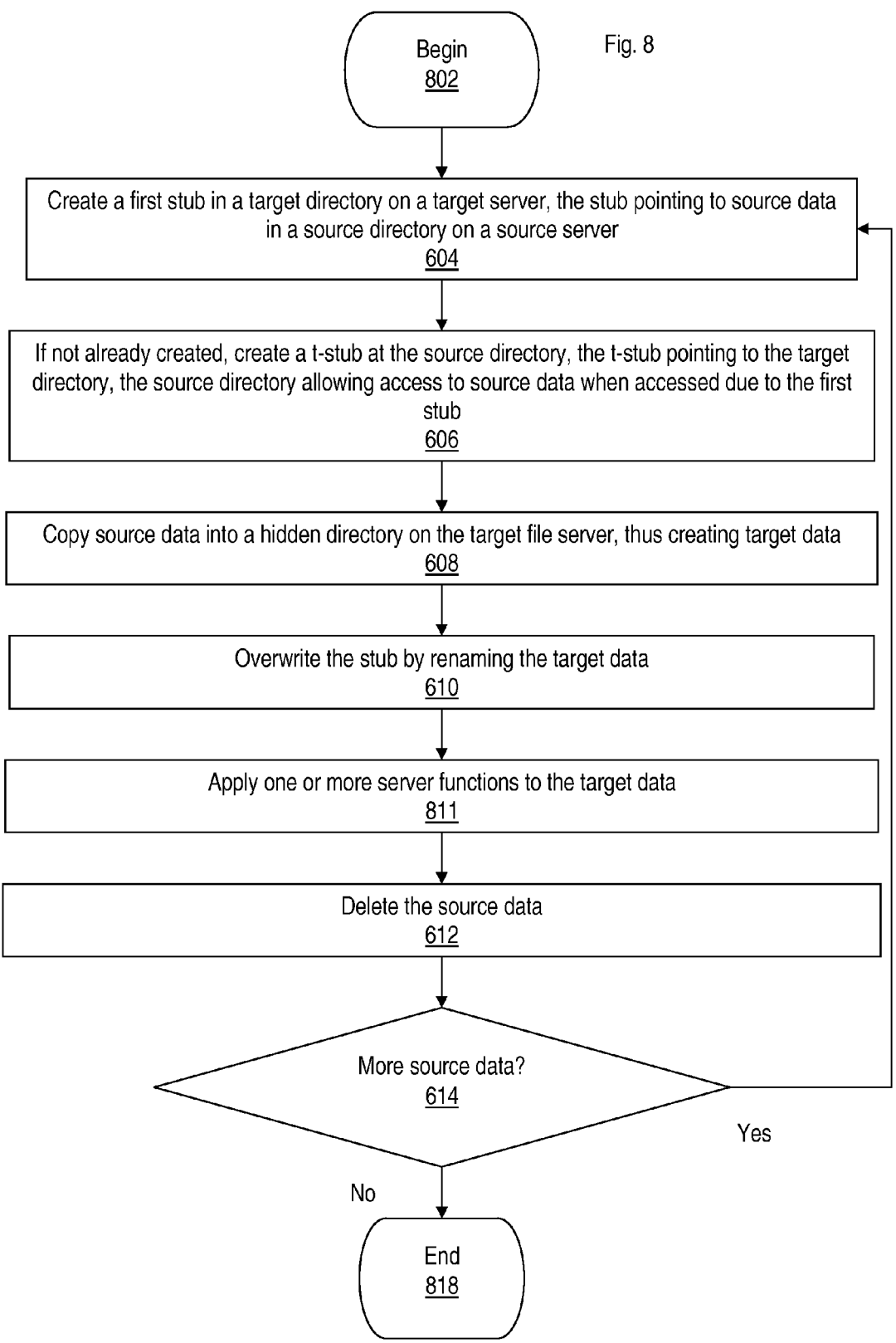

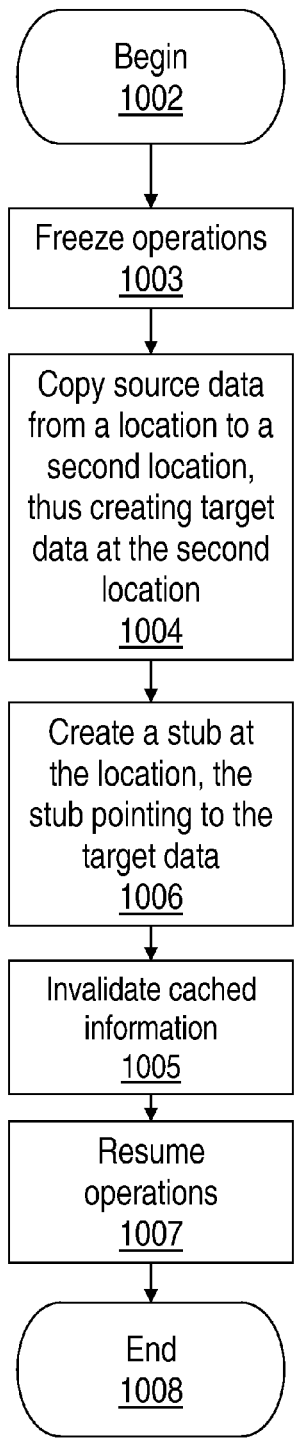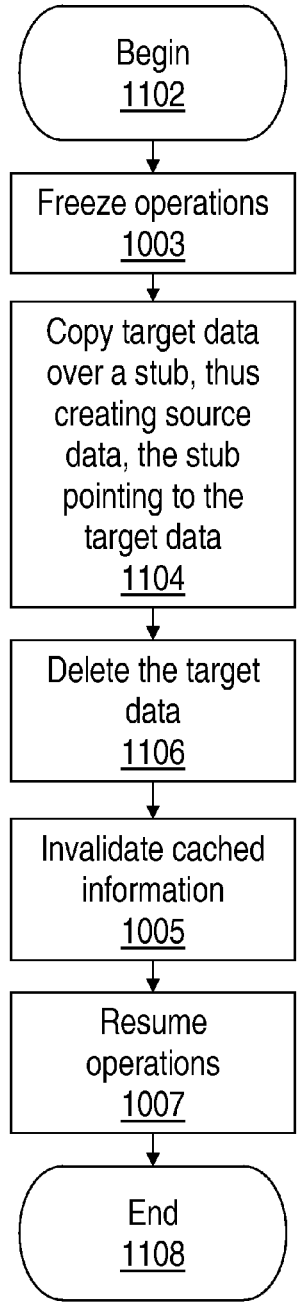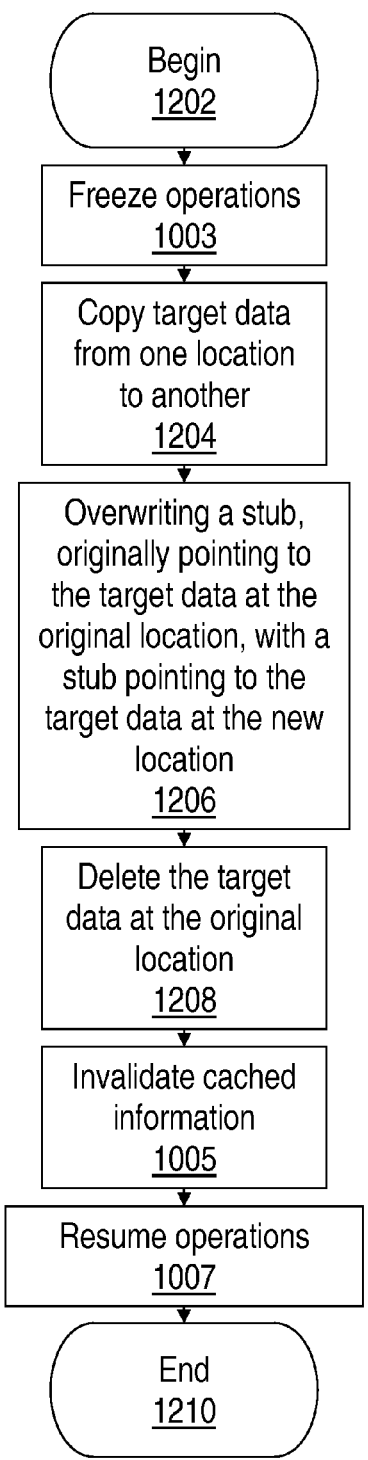

OPEN FILE MIGRATION OPERATIONS IN A DISTRIBUTED FILE SYSTEM

BACKGROUND

Network administrators need to efficiently manage file servers and file server resources while keeping them protected, yet accessible, to authorized users. The practice of storing files on distributed servers makes the files more accessible to users, reduces bandwidth use, expands capacity, and reduces latency. However, as the number of distributed servers rises, users may have difficulty finding files, and the costs of maintaining the network increase. Additionally, as networks grow to incorporate more users and servers, both of which could be located in one room or distributed all over the world, the complexities administrators face increase manifold. Any efficiency that can be gained without a concordant increase in cost would be advantageous.

SUMMARY

In order to capture such efficiencies, methods for open file migration operations in a distributed file system are described herein. In at least some disclosed embodiments, a method includes a) creating a first stub file on a target file server. The first stub file is created in a target directory, and the first stub file points to source data in a source directory on a source file server. The source data is open for access. The method further includes b) creating a t-stub file at the location of the source directory. The t-stub file points to the target directory, and the source directory allows access to source data when accessed due to the first stub file. The method further includes c) disabling performance of operations on source data while allowing completion of operations in progress, and d) copying source data into a hidden directory on the target file server, thus creating target data. The method further includes e) overwriting the first stub file by renaming the target data, f) enabling performance of operations on the target data, g) performing queued operations on the target data, and h) deleting source data from the source file server.

In further disclosed embodiments, a computer-readable medium stores a software program that, when executed by a processor, causes the processor to a) create a first stub file on a target file server. The first stub file is created in a target directory, and the first stub file points to source data in a source directory on a source file server. The source data open for access. The processor is further caused to b) create a t-stub file at the location of the source directory. The t-stub file points to the target directory, and the source directory allows access to source data when accessed due to the first stub file. The processor is further caused to c) disable performance of operations on source data while allowing completion of operations in progress, and d) copy source data into a hidden directory on the target file server, thus creating target data. The processor is further caused to e) overwrite the first stub file by renaming the target data, f) enable performance of operations on the target data, g) perform queued operations on the target data, and h) delete source data from the source file server.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the accompanying drawings and detailed description, wherein like reference numerals represent like parts:

FIG. 2 illustrates a method of stub file detection in accordance with at least some embodiments;

FIG. 3 illustrates a method of responding to a "list" request in accordance with at least some embodiments;

FIG. 4 illustrates a method of responding to a "delete" request in accordance with at least some embodiments;

FIGS. 5A-5E illustrate data manipulation in accordance with at least some embodiments;

FIG. 6 illustrates a method of migrating source data in accordance with at least some embodiments;

FIG. 7 illustrates a method of migrating source data while the source data is open in accordance with at least some embodiments;

FIG. 8 illustrates a method of applying server functions to a DFS system in accordance with at least some embodiments;

FIG. 10 illustrates a method of demoting data in accordance with at least some embodiments;

FIG. 11 illustrates a method of promoting data in accordance with at least some embodiments;

FIG. 12 illustrates a method of transmoting data in accordance with at least some embodiments.

DETAILED DESCRIPTION

It should be understood at the outset that although an illustrative implementation appears below, the present disclosure may be implemented using any number of techniques whether currently known or later developed. The present disclosure should in no way be limited to the illustrative implementations, drawings, and techniques illustrated below, but may be modified within the scope of the appended claims along with their full scope of equivalents.

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to". Also, the term "couple" or "couples" is intended to mean an indirect or direct electrical connection, optical connection, etc. Thus, if a first device couples to a second device, that connection may be through a direct connection, or through an indirect connection via other devices and connections. Additionally, the term "system" refers to a collection of two or more hardware components, and may be used to refer to an electronic device or circuit, or a portion of an electronic device or circuit.

Figure 1:
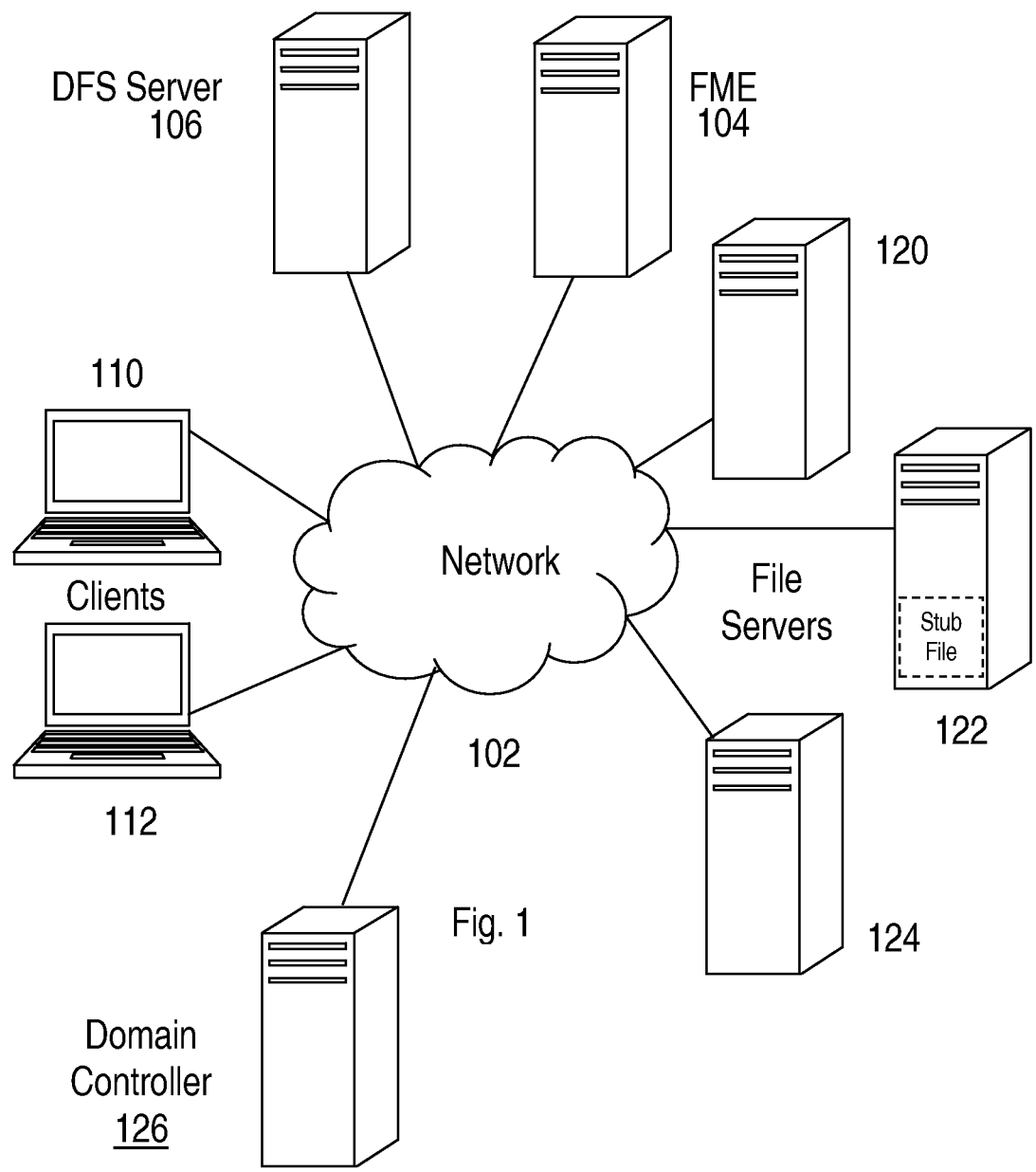
FIG. 1 illustrates a distributed file system ("DFS"), employing a DFS server and file migration engine ("FME") in accordance with at least some embodiments of the invention.
Figure 9:
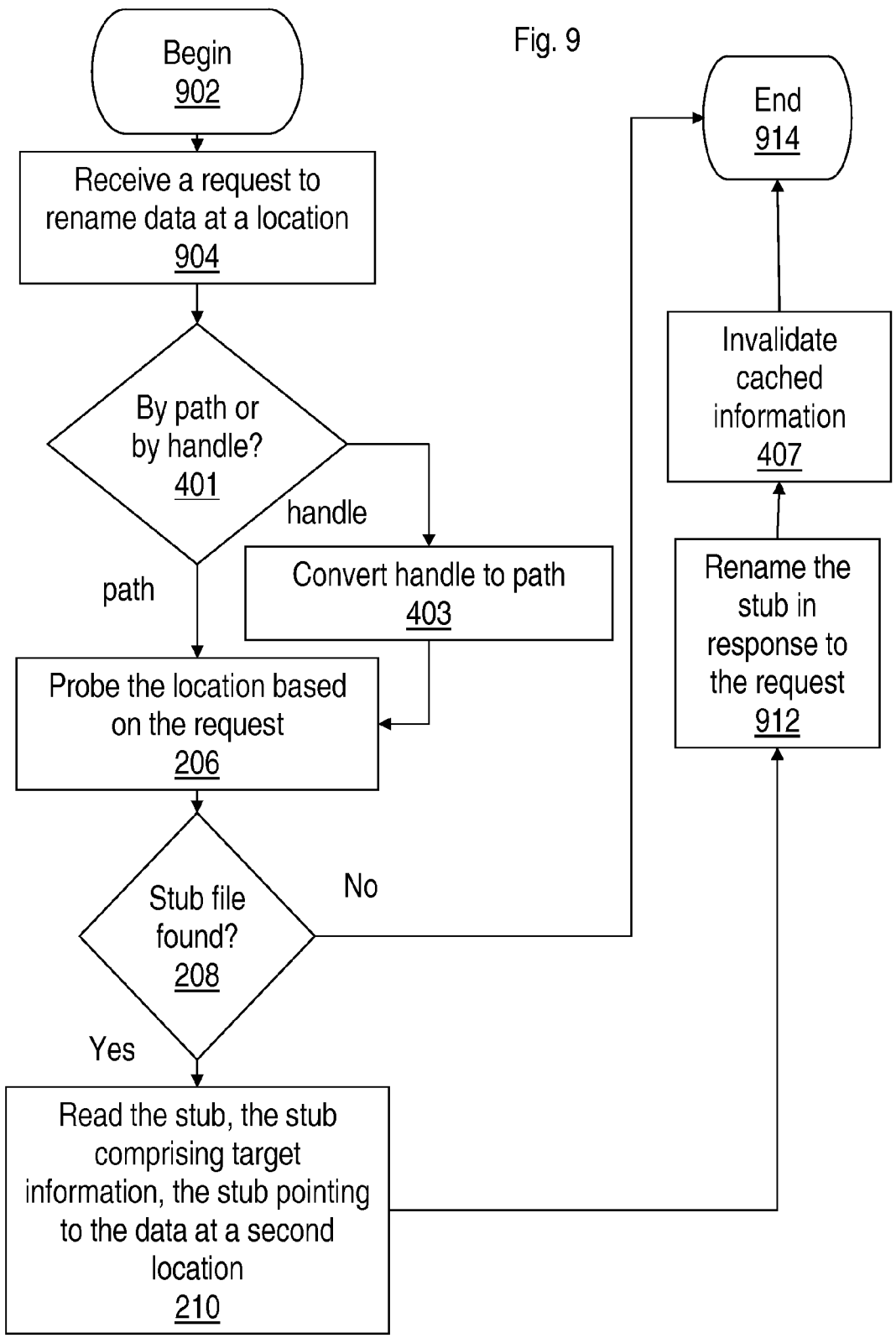
FIG. 9 illustrates a method of responding to a "rename" request in accordance with at least some embodiments.

FIG. 1 shows an illustrative distributed file system ("DFS"). In the example of FIG. 1, two user computers, also called clients, 110, 112 are coupled to three file servers ("servers") 120, 122, and 124, via a network 102. The system of FIG. 1 enables efficient data access by the clients 110, 112 because available disk space on any server 120-124 may be utilized by any client 110, 112 coupled to the network 102. Contrastingly, if each client 110, 112 had only local storage, data access by the clients 110, 112 would be limited. Server 122 contains a stub file, which is discussed in greater detail below.

A DFS server 106 is also coupled to the network 102. Preferably, the DFS server 106 is a Microsoft DFS server. The DFS server 106 enables location transparency of directories located on the different file servers 120-124 coupled to the network 102. Location transparency enables users using the clients 110, 112 ("users") to view directories residing under disparate servers 120-124 as a single directory. For example, suppose a large corporation stores client data distributed across server 120 in Building 1, server 122 in Building 2, and server 124 in Building 3. An appropriately configured DFS server 106 allows users to view a directory labeled \\Data\ClientData containing the disparate client data from the three servers 120-124. Here, "Data" is the machine name hosting "ClientData." The data in the directory \Data\ClientData are not copies, i.e., when a user uses a client 110, 112 to access a file located in a directory the user perceives as \\Data\ClientData\ABC\, the client 110, 112 actually accesses the file in the directory \\Server122\bldg2\clidat\ABCcorp\. Here, "bldg2" is a share on server 122. Most likely, the user is unaware of the actual location, actual directory, or actual subdirectories that the client 110, 112 is accessing. Preferably, multiple DFS servers 106 are used to direct traffic among the various servers 120-124 and clients 110, 112 to avoid having a bottleneck in the system and a single failure point. Accordingly, a domain controller 126 is coupled to the network 102. The domain controller 126 comprises logic to select from among the various DFS servers for routing purposes. Preferably, the domain controller is configured via Microsoft Cluster Services.

Considering a more detailed example, suppose employee data regarding employees A, B, and C are stored on servers 120, 122, and 124 respectively. The employee information regarding A, B, and C are stored in the directories \\Server120\employee\personA\, \\Server122\emply\bldg2\employeeB\, and \\Server124\C\, respectively. Thornton is a human resources manager using a client 110. Appropriately configured, the DFS server 106 shows Thornton the directory \\HR\employees\ containing subdirectories A, B, and C, which contain the employee information from the disparate servers 120-124 respectively. When Thornton uses the client 110 to request the file "Bcontracts.txt," located at the path he perceives to be \\HR\employees\B\Bcontracts.txt, the client 110 actually sends a request to the DFS server 106. In response, the DFS server 106 returns the path \\Server122\emply\bldg2\employeeB\ to the client 110. The returned path is where the file Bcontracts.txt is actually located, and is termed a "referral." Next, the client 110 "caches," or stores, the referral in memory. Armed with the referral, the client 110 sends a request to the server 122 for the file. Thornton is unaware of the referral. Preferably, the client 110 sends subsequent requests for Bcontracts.txt directly to server 122, without first sending a request to the DFS server 106, until the cached referral expires or is invalidated. If the client 110 is rebooted, the cached referral will be invalidated.

A file migration engine ("FME") 104 is also coupled to the network 102. The FME 104 receives traffic, including requests, between the clients 110, 112 and the servers 120-124. Preferably, the DFS server 106 is configured to send requests to the FME 104. After receiving a request, the FME 104 modifies the request. Specifically, the FME 104 modifies the request's routing information in order to forward the request to a file server 120-124. Also, the FME 104 moves, or migrates, data among the servers 120-124, and the FME 104 caches each migration. Considering these capabilities in conjunction with each other, the FME 104 performs any or all of: migrating data from one file server (a "source" server) to another file server (a "target" server); caching the new location of the data; and forwarding a request for the data, destined for the source file server, to the target file server by modifying the request. Subsequently, in at least some embodiments, the FME 104 continues to receive traffic between the client and the target file server.

In other embodiments, the FME 104 removes itself as an intermediary, thereby ceasing to receive such traffic between the client and the target file server. Such functionality is useful when the FME 104 is introduced to the network 102 specifically for the purpose of migrating data, after which the FME 104 is removed from the network 102.

Although only three file servers 120-124, one DFS server 106, one FME 104, one domain controller 126, and two clients 110, 112 are shown in FIG. 1, note that any number of these devices can be coupled via the network 102. For example, multiple FMEs 104 may be present and clustered together if desired, or multiple DFS servers 106 may be present. Indeed, the FME 104 may even fulfill the responsibilities of the DFS server 106 by hosting DFS functionality. As such, clients need not be configured to be aware of the multiple FMEs 104. Please also note that the data (termed "source data" before the migration and "target data" after the migration) may be a file; a directory (including subdirectories); multiple files; multiple directories (including subdirectories); a portion or portions of a file, multiple files, a directory (including subdirectories), or multiple directories (including subdirectories); or any combination of preceding.

Returning to the previous example, suppose server 124 in Building 3 has received a storage upgrade, such that all client data can now be stored exclusively on server 124. Rose is a computer administrator. Because the client data is sensitive, Rose prefers all the client data to be on one server, server 124, for increased security. Consequently, Rose implements a "data life-cycle policy." A data life-cycle policy is a set of rules that the FME 104 uses to determine the proper location of data among the file servers 120-124. In the present example, Rose configures the data life-cycle policy to include a rule commanding that all client data belongs on server 124. As such, the FME 104 periodically scans the servers 120-124, and the FME 104 migrates client data based on the rule. The migration preferably occurs without users experiencing interruption of service or needing to adjust their behavior in response to the migration.

In an effort to further increase security, Rose outfits file server 124 with encryption capabilities, thus making the file server 124 an "encryption server." An encryption server 124 obscures data stored on the encryption server by using an encryption algorithm to manipulate the data into an unrecognizable form according to a unique encryption key. A decryption algorithm restores the data by reversing the manipulation using the same encryption key or a different unique decryption key. The more complex the encryption algorithm, the more difficult it becomes to decrypt the data without access to the correct key. By using the FME 104 to migrate client data to the encryption server 124, Rose is relieved of the burden of outfitting every server containing client data with encryption capability, and Rose is not required to interrupt service to the users during the migration. Any requests to the migrated client data are routed to server 124 by the FME 104 as described above. As such, encryption can be applied to any data on the servers 120-124, even though servers 120 and 122 do not have encryption capabilities, as long as encryption server 124 can store the data. If, for example, the encryption server cannot store all the data to be encrypted, Rose can couple multiple encryption servers to the network 102 until the need is met. When encryption is provided in such a fashion, encryption is termed a "server function."

Considering another server function, file server 120 has "de-duplication" functionality, making the server a "de-duplication server." De-duplication is sometimes referred to as "single instance store" (SIS) when applied at the file level; however, this document uses the term de-duplication as applying to any granularity of data. A de-duplication server periodically searches its storage for duplicated information, and preferably deletes all but one instance of the information to increase storage capacity. The deletion of all but one instance of identical data is termed "de-duplicating" the data. Any requests to the deleted information are routed to the one instance of the information remaining. For example, suppose the servers 120, 122, and 124 contain duplicate copies of the same file, and the file has a size of 100 megabytes (MB). The servers 120-124 are collectively using 300 MB to store the same 100 MB file. The files on server 122 and 124 preferably are migrated to de-duplication server 120, resulting in three identical files on de-duplication server 120. The de-duplication server 120 is programmed to de-duplicate the contents of its storage, and thus, deletes two out of the three files. With only one file remaining, the servers 120-124 collectively have 200 MB more space to devote to other files. De-duplication applies not only to whole files, but to portions of files as well. Indeed, the source data may be a portion of a file, and consequently, the server function is applied to the portion. The data life-cycle policy rules used to determine data to be migrated to the de-duplication server 120 need not include a rule requiring that only identical data be migrated. Rather, data that is merely similar can be migrated, leaving the de-duplication server 120 to determine if the data should be de-duplicated or not.

Considering yet another server function, server 122 comprises a "compression server." A compression server increases storage capacity by reducing the size of a file in the compression server's storage. A file size is reduced by eliminating redundant data within the file. For example, a 300 KB file of text might be compressed to 184 KB by removing extra spaces or replacing long character strings with short representations. Other types of files can be compressed (e.g., picture and sound files) if such files have redundant information. Files on servers 120 and 124 to be compressed are migrated to compression server 122. The compression server 122 is programmed to compress files in its storage, thus allowing for more files to be stored on the collective servers 120-124 in the same amount of space. The FME 104 forwards any requests for the migrated information to compression server 122 as described above.

The uninterrupted access to data across multiple servers 120-124 is used to apply server functions to the entire distributed file system without requiring that each server have the ability to perform the server function. In at least some preferred embodiments, a server 120-124 applies server functions to only portions of the server's storage, reserving other portions of the server's storage for other server functions or storage that is not associated with any server function. In such a scenario, the target file server may be the same as the source file server. The server functions described above are used as examples only; all server functions can be used without departing from the scope of various preferred embodiments.

Consider the FME 104 migrating the file Bcontracts.txt to compression server 120. In order to provide access to the file without interruption, the FME 104 creates a "stub file," or simply a "stub," as part of the migration process. A stub is a metadata file preferably containing target information and source information. Target information includes information regarding a target file server, target share (a discrete shared portion of memory on a target file server), and target path in order to describe the location of data moved to the target file server. Target information also includes target type information to describe the nature of the data (e.g., whether the target data is a file or directory). Preferably, the stub also includes a modified timestamp. Source information includes similar information that references the source location of the data, e.g., source file server, source share, etc. A stub need not reflect a value for every one of the categories listed above; rather, a stub can be configured to omit some of the above categories. Because a stub is a file, the stub itself has metadata. Hence, target and source information may be implicit in the stub's metadata and location. Indeed, source information may usually be determined from the location and metadata of the stub file because stubs are left in the location of source data when a FME 104 moves the source data from a source file server to a target file server. As such, target information is preferably read from a stub's contents, while source information is read from a stub's metadata. A stub preferably comprises an XML file.

The terms "source" file server and "target" file servers are merely descriptors in identifying data flow. A source file server is not perpetually a source file server, and indeed can be simultaneously a source file server and a target file server if more than one operation is being performed or if the data is being migrated from one portion of a file server to another portion of the same file server. Additionally, in the scenario where a stub points to second stub, and the second stub points to a file, the file server on which the second stub resides is simultaneously a source file server and a target file server.

Considering a more detailed example, and referring to FIGS. 1 and 2, FIG. 2 illustrates a method of stub file detection beginning at 202 and ending at 214. When Thornton uses a client 110 to access Bcontracts.txt with a file operation request, e.g. "open", the client 110 is referred by the DFS server 106 to the FME 104 instead of directly to server 122. Examples of other file operations comprise close, delete, rename, read, write, query, find, etc. After the referral, the request from client 110 is received 204 by the FME 104. If cached information about the location of the file is available 205, the FME 104 modifies 213 the request to reflect the cached information. Preferably, the routing information of the request is modified. The FME 104 then forwards 213 the modified request to the correct server, the server with containing the file Bcontracts.txt, server 120, based on the modification. If cached information is unavailable 205, the FME 104 probes 206 server 122. Preferably, the FME 104 probes the server 122 for a stub at the location that Bcontracts.txt is expected to exist.

If a stub is found 208, the FME 104 reads 210 the stub, including reading target information and source information alone or in combination. In this example, the target information reveals that Bcontracts.txt is stored at a second location, on compression server 120 ("second file server"), rather than server 122. Preferably, each subdirectory of the second location is probed 206 to ensure that the request is not being sent to another stub, e.g. as a result of Bcontracts.txt or one of its parent directories being moved to a third location and replaced with another stub file. If another stub file is found 208, the target information is read 210 and stored 212, the cache is checked 205 for information regarding the location of the target information, and the new third location is probed 206 if no information is available. This process is repeated until no more stubs are found 208.

The FME 104 caches 212 at least some of the target information, e.g. the location of the requested file, and source information, e.g. the location of the stub file, such that a subsequent request for Bcontracts.txt from a client 110, 112 will not result in a probe of server 122, but will be modified and forwarded to compression server 120 without probing server 122. Also, target type information is preferably cached as well, e.g., whether the data to which the stub points is a file or directory. Next, the FME 104 modifies 213 the open request it received from client 110 to based on the target information. Preferably, the routing information of the request is modified relative to the stub location. The FME 104 then forwards 213 the modified request, here, to compression server 120.

If a stub is not found 208, preferably the FME 104 forwards the request to server 122. Also, the result of the probe, e.g. information signifying the absence of a stub, is preferably cached by the FME 104 such that a subsequent request for Bcontracts.txt will not lead the FME 104 to perform another probe.

In at least some embodiments, the cached information is written to a file for display to a computer administrator. The file is preferably a log file, which is displayed to a computer administrator via a client 110, 112. In various embodiments, the stub itself is displayed to the computer administrator via a client 110, 112, and the computer administrator edits the stub via the client 110, 112. The cached information will be effective until it is invalidated or deleted, e.g., to free memory for new cached information about another file, directory, or stub.

Referring to FIGS. 1, 2, and 3, FIG. 3 illustrates a method of responding to a list request beginning at 302 and ending at 314. In order to maintain location transparency, information about a stub should not appear in a listing of the contents of a directory in which the stub resides. Rather, the user should be provided information about the file or directory to which the stub points. For example, suppose Thornton uses a client 110 to request a list of the contents of the directory \\HR\employees\B\. The DFS server 106 refers the client 110 to the FME 104, and the request from client 110 is received 304 by the FME 104. The method of FIG. 2 is performed, repeatedly if necessary to ensure that the directory has not been moved and replaced by a stub. Subsequently, the FME 104 searches 306 for a unique symbol in \\Server122\emply\bldg2\employeeB\ ("first directory"), the directory specified by the referral. The unique symbol preferably includes a modified timestamp, and is associated with a stub file in the first directory. Finding 308 the unique symbol, the FME 104 preferably verifies 309 a stub associated with the unique symbol exists in the first directory. The probing procedure described in FIG. 2 is preferably used to verify the existence of a stub if no cached information is available. Here, a stub exists in the place of Bcontracts.txt (which has been moved to compression server 120). The stub points to a second directory, \\Server120\employee\personB\ on compression server 120, as the location of the file. Hence, the FME 104 provides 310 information about Bcontracts.txt, residing in the directory pointed to by the stub in response to the request.

Preferably, the FME 104 also provides information about other files pointed to by other stub files residing in the first directory, the other stub files also represented by modified time stamps. Such files may reside on second and third directories, and on different file servers 120-124. Note that the results provided are not a merging of the results of separate list requests, rather information about files in directories, other than the directory that is subject to a list request, is provided along with the response to the request. Such information is provided in place of the information about the stub file that would otherwise have been returned. Such information includes file size, access time, modification time, etc. However, location information about the stub file is still provided.

The FME 104 provides the information about the files to the client 110, and the client 110 displays the information to Thornton. As such, Thornton does not view the stub pointing to Bcontracts.txt, information about the stub, or any other stubs in response to the list request; instead, Thornton views information about files or directories to which the stubs point in order to preserve the illusion that the files on disparate servers all reside in one directory. If the FME 104 does not find 308 a unique symbol, the FME 104 only provides 312 the contents of the first directory in response to the request.

In order to prevent a "memory leak" on a file server 120-124, a stub should be deleted when the file to which the stub points is deleted. A memory leak refers to allocated memory never being unallocated. A memory leak is particularly harmful when the allocation occurs repeatedly, e.g., when the file allocation occurs as part of a loop of computer code. In such a scenario, the entire memory of the file server may be allocated until the file server becomes unstable. The deletion of a file or directory, but not the corresponding stub, causes a memory leak because the memory allocated to the stub is never unallocated. Furthermore, because the stub still exists, the client 110, 112 expects the deleted data to exist, and will only detect that the data does not exist when trying to access the data through the stub. If a file or directory has no corresponding stub, the FME 104 is still preferably notified when the file or directory is deleted so that the FME may be kept up-to-date by, e.g., invalidating any cached information regarding the file or directory.

Referring to FIGS. 1, 2, and 4, FIG. 4 illustrates a method of deleting data beginning at 402 and ending at 416. To avoid memory leaks, the FME 104 preferably follows the same method as described above in regards to an "open" request 206, 208, 210. However, the request received 404 is specifically to delete data from a first file server, and preferably the request is received by the FME 104 as a result of a DFS referral. If a delete "by handle" is requested 401, requiring an opening of data to be deleted to provide a reference, or "handle," preferably the handle is converted into the path of the data 403. If the data to be deleted does not correspond to a stub, the data is deleted 414 and information regarding the data cached in the FME 104 is invalidated 407 such that stale cache information is not used with current on-disk information and vice versa. If a corresponding stub is found 208, the FME 104 deletes 414 the stub to prevent a memory leak, after reading the stub 210. The FME 104 repeats the process if the stub points to another stub 413, deleting 414 each stub in the process. Ultimately, once a non-stub is encountered 413, the FME 104 forwards 412 the request to a second file server based on target information of the most recently deleted stub, thus deleting the data. Next, cached information is invalidated 407 such that stale cache information is not used with current on-disk information and vice versa.

FIGS. 1, 5, and 6 illustrate how a directory migration is performed using de-duplication as the server function. FIG. 6 begins at 602 and ends at 616. Server 124 is the de-duplication server, and file "A" is to be de-duplicated. On server 120, file A is located in the directory \\Server120\SH1\directory1\ as illustrated in FIG. 5A. On server 122, an identical file A is located in the directory \\Server122\SH2\directory2\. Rose has implemented a data life-cycle policy to migrate not only directories containing identical files to the de-duplication server 124, but directories containing files with some common data. Consequently, the FME 104 periodically searches for such data among the servers 120-124 coupled to the network 102, and recognizes that the directories containing files A qualify for migration. Thornton, using client 110, should not be made aware of any migration, de-duplication, or service interruption.

To accomplish the migration with these restrictions, the FME 104 creates 604 a first stub (one first stub for each file A, the stub illustrated in FIGS. 5B-5E as "$A") in a target directory on server 124 (a "target file server"). One first stub points to file A ("source data") on server 120 (a "source file server") in a source directory, and the other first stub points to another directory (another source directory) containing file A (more source data) on server 122 (another source file server). For simplicity, the example will continue in terms of one of the files A. The procedure is mirrored for the other file. At this point, the FME 104 preferably routes access to the file A through the first stub on the target file server 124, despite the fact that the file continues to be in its original location. Such redirection is performed in preparation for the ultimate result of the file residing on the target file server. Accordingly, a "t-stub" (illustrated in FIGS. 5C and 5D as "$$A") is created 606. The t-stub is a stub with unique properties that are useful during migration. The t-stub is created at the source directory, points to the target directory, and deleted (usually replaced by a normal stub) once migration is complete. Also, the t-stub partially overrides normal functioning of the source directory. If a client 110, 112 attempts to access source data during migration of the directory, the t-stub will redirect the request to target directory. If the data attempting to be accessed has not yet been migrated, the request will be directed to the first stub. Upon accessing the first stub, the request will be redirected to the source directory. Once such redirection is detected, normal functioning of the source directory is allowed, and access to the source data is granted. Additionally, the t-stub is created only once at the root of the directory being migrated.

Next, the FME 104 copies 608 the source data, file A, onto the target file server 124. In doing so, the FME 104 preferably accesses another type of stub with unique properties, the "s-stub." The s-stub is a stub that specifies a hidden location on the target file server 124 at which the FME 104 copies the source data. Preferably, the hidden location is determined without human input. The data that is copied is termed "target data" in order to distinguish the file from the source data, which still exists at this point on the source file server as illustrated in FIG. 5D. Preferably, after the copy, the target data in the hidden directory is checked against the source data to verify the two are identical. Next, the FME 104 renames 610 the target data such that the target data overwrites the first stub. Accordingly, because of the routing precautions taken, requests routed to the t-stub will be routed to the target directory, and hence the file A, without any further action. Next, the FME 104 deletes 612 the source data. Because precautions were taken to route access to the files through the stub on the target file server, it is safe to delete the source data once the target data is accessible on the target file server. A normal stub file may reference an s-stub file via a reference to the s-stub file appearing in the target information of the normal stub. In such a scenario, the target information of the normal stub comprises the reference to the s-stub while the s-stub comprises target file server, target share, target path, and target type information. In a slightly different scenario, the target information of the normal stub comprises the reference to the s-stub as well as target path information (represented by a global unique identifier) while the s-stub comprises target file server, target share, and target type information.

Preferably, if the FME 104 intercepts a request to access the file A after the copy onto the target file server, but before performing the renaming/overwrite, the FME 104 will perform the renaming/overwrite in sufficient time to honor the request. If the directories contained more source data, at this point the above steps would be repeated 614 for the further files and subdirectories. However, a new t-stub would not be created for each iteration. In the case of a subdirectory in the source directory, the steps would be repeated as if the subdirectory was the source directory; however, instead of the rename 610 overwriting the first stub, the first stub is deleted before the renaming occurs. A new t-stub will not be created for the subdirectory either.

After the migration of the directory is complete, the FME 104 replaces the t-stub and the source directory with a stub pointing to the target directory as illustrated in FIG. 5E because the special utility of the t-stub is no longer needed. The other directory containing file A is migrated simultaneously using the same procedure.

Finally, the identical files A are ready for de-duplication. The files both appear on de-duplication server 124, and stubs that point to the files appear in the files' original locations on the source file servers 120, 122. At this point, the FME 104 forwards requests for the files A to the de-duplication server 124 instead of the source file servers 120, 122 as described above. Note that the de-duplication server 124 is merely a file server with de-duplication functionality. Indeed, the server 124 may have other server functions, alone or in combination. The de-duplication server 124 is free to perform its de-duplication algorithm without interrupting Thornton's access to file A, and does so as illustrated in FIG. 5E. After de-duplication, requests for the deleted file A are forwarded to the remaining file A on the de-duplication server 124. Indeed, Thornton probably is not aware that de-duplication has occurred because he remains able to view the file A in whichever directory the DFS server 106 is configured to show him, as a result of the list request handling described above. This method is followed whether files or portions of files in directories or subdirectories are migrated singly or simultaneously.

Referring to FIGS. 1, 6, and 7, FIG. 7 illustrates a method of migrating source data while the source data is open beginning at 702 and ending at 722. In order to migrate a directory when some source data is open for access 704, a number of elements from the normal directory migration are repeated 606, 608, 610. However, a number of precautions should be taken to preserve the integrity of the migrated data. The method illustrated in FIG. 7 exploits "locking" to provide uninterrupted service during migration of open files. When a client 110 requests to open a file stored on the servers 120-124, the client 110 is granted a "lock" on the file. Different levels of locks are used to restrict different types of access to the file by another client 112. For example, a lock may restrict another client 112 from writing to the locked file, but allow the other client 112 to read the locked file. A different lock may restrict another client 112 from writing and reading the locked file. In order to make read and write operations on the locked file appear faster to the user using the client 110 that was granted the lock, the client 110 caches a copy of the file. The copy of the file (on client 110) is termed the "local copy," and the original file (on a server 120-124) is termed the "network copy." The read and write operations are then performed on the local copy. This procedure is termed "local caching." Local caching decreases system traffic because a continuous stream of data is not established between the client 110 and the servers 120-124. Periodically, (e.g., once per minute) synchronizing updates are sent by the client 110 to the server 120-124. The updates are applied to the network copy such that the network copy reflects the local copy. This procedure is termed "write caching." The updates ensure that not all data is lost in the event of client 110 instability. Write caching also helps decrease system traffic because the updates contain only the changes made to the local copy, which is a smaller amount of information than if the update contained the entire local copy in order to overwrite the network copy.

Returning to FIGS. 1, 6, and 7, suppose Thornton is using client 110 to edit a file in a directory ("source data") that is to be migrated to another server (a "target file server"). Thornton should not be required to close the file so migration can occur. Nor should Thornton be made aware of any service interruption. In order to accomplish the migration with these restrictions, the FME 104 disables 708 performance of operations on the source data. However, any operations in progress are allowed to be completed. Preferably, the FME 104 rescinds operations in progress that cannot be completed, and sends a close request to the source data. The FME 104 also preferably intercepts any requests for the source data from computer 110. Because requests are being redirected to the FME 104, the client 110 waits for responses to requests for the source data from the FME 104, rather than returning an error to Thornton. The response time is preferably minimized. The FME 104 also preferably receives updates for the network copy from the client 110. Preferably, the updates are being stored, to apply to the network copy after the file migration occurs.

Preferably, the FME 104 stores state information, lock information, and log information regarding the source data. State information comprises properties of the source data, but not its contents. Lock information comprises what types of locks have been granted for any of the source data, how many locks have been granted, and to which users the locks have been granted. Log information comprises changes occurring to the source data, including the local copy. The changes comprise the intercepted requests and updates.

After the copy 608 and overwrite 610, the FME 104 enables 714 performance of operations and performs 716 any queued operations on the target data. Preferably, the FME 104 reissues rescinded operations and applies the stored state information, lock information, and log information to the source data. Applying stored state information comprises adjusting any file properties that have changed during the migration. Applying lock information comprises resetting locks to their settings before the file migration. Applying log information comprises honoring the intercepted access requests, and applying the intercepted updates to the network copy. Preferably, the FME 104 also sends an open request to the target data. Next, as described above, the process is repeated for source data yet to be migrated 614. Finally, the FME 104 deletes 818 the source data. If the response time to a request or update exceeds any desired threshold, and the corresponding file has not been copied, in various embodiments the FME 104 enables operations and performs the queued operations in order to prevent a timeout error. Once the queued operations have been performed, the FME 104 will attempt the disable and queue operations again.

Referring to FIGS. 1, 6, and 8, FIG. 8 illustrates a method of applying server functions in a DFS system beginning at 802 and ending at 818. To apply server functions in a DFS environment, the FME preferably follows the same method as described above in regards to directory migration at FIG. 6, directory migration with open files at FIG. 7, or below with regards to file migration at FIGS. 10-12. Additionally, the target file server 120-124 applies the server function to the target data 812. As mentioned previously, the server function may be compression, encryption, de-duplication, etc. Additionally, server functions can be used alone or in combination and may be performed on files, directories, subdirectories, and portions of files whether open for access or not. Preferably, the data to be migrated to the target file server is determined based on a data life-cycle policy.

Referring to FIGS. 1, 2, 4, and 9, FIG. 9 illustrates a method of responding to a rename request beginning at 902 and ending at 914. To perform a rename operation in a DFS environment, the FME 104 preferably follows the same method as described above in regards to an "open" request 206, 208, 210 and "list" request 401, 403. However, the request received 904 is specifically to rename data at a location, though preferably the request is received by the FME 104 as a result of a DFS referral. Also, the FME 104 renames 912 the stub in response to the request. The data to which the stub points need not be renamed, and if the stub points to a second stub, the second stub need not be renamed either. However, the cached information regarding the stub is preferably invalidated 407 such that stale cache information is not used with current on-disk information and vice versa.

Referring to FIG. 10, FIG. 10 illustrates a method of demoting data beginning at 1002 and ending at 1008. To "demote" a file, operations on source data are preferably frozen. Freezing operations harmonizes an on-disk change 1004, 1006 with invalidation of cached information 1005 such that stale cache information is not used with current on-disk information and vice versa. Next, source data is copied 1004 from one location to another, thus creating target data. Next, a stub is created 1006 at the location of the source data. Preferably, the stub points to target data at the second location, and the demotion is caused by determining that the source data qualifies for migration based on a data life-cycle policy. Next, the cached information is preferably invalidated 1005, resulting in the deletion of stale stored information about the source data. Next, operations are resumed 1007, as cached information will not conflict with on-disk data.

Referring to FIGS. 10 and 11, FIG. 11 illustrates a method of promoting data beginning at 1102 and ending at 1108. Similar to FIG. 10, operations are frozen 1003, cached information is invalidated 1005, and operations are resumed 1007. Operations are frozen on target data and resumed on source data (in keeping with the terms used in the demotion context). To "promote" a file, first target data is copied 1104 over the stub that points to the target data, hence creating source data. Next, the target data is deleted 1106. Preferably, the promotion is caused by determining that the target data qualifies for migration based on a data life-cycle policy.

Referring to FIG. 12, FIG. 12 illustrates a method of transmoting data beginning at 1202 and ending at 1210. Similar to FIG. 10, operations are frozen 1003, cached information is invalidated 1005, and operations are resumed 1007. Operations are frozen on target data at an original location and resumed on target data at a target location (in keeping with the terms used in the demotion context). To "transmote" a file, target data is copied 1204 from an original location to a target location. Next, a stub that points to the target data at the original location is overwritten 1206 with a second stub that points to the target data at the target location. Preferably, the second stub is created in a hidden directory and moved from the hidden directory to the location of the first stub. Next, the target data at the original location is deleted 1208. Preferably, the transmotion is caused by determining that the target data qualifies for migration based on a data life-cycle policy.

The methods described above enable the FME 104 to use target file servers to apply 1009 server functions, such as compression, encryption, and de-duplication, to target data throughout a distributed file system without disrupting service to the users by using a FME 104 to migrate the information, and using stubs to direct client 110, 112 requests and updates. In various embodiments, a computer administrator managing such a distributed file system implements policies for system optimization according to the specific needs of the users in conjunction with the specific capabilities of the distributed file system. For example, a computer administrator may implement the following policies. A file not accessed within the last 30 days will be moved to a compression server to increase storage space (demotion). Upon subsequent access to this file, the file will be migrated to a "current working" server designed for increased stability (promotion). After thirty days of inactivity, the file will once again be migrated to the compression server (demotion). Finally, after one year of inactivity the file will be migrated to a deep storage server designed for long-term file storage (transmotion). These migrations will not affect how users access the file, nor will the migrations increase the time users spend searching for the file. However, the migrations will result in saving space on servers and using the strengths of certain servers effectively. Other policies combined with other server functions will result in other efficiencies.

Figure 13:
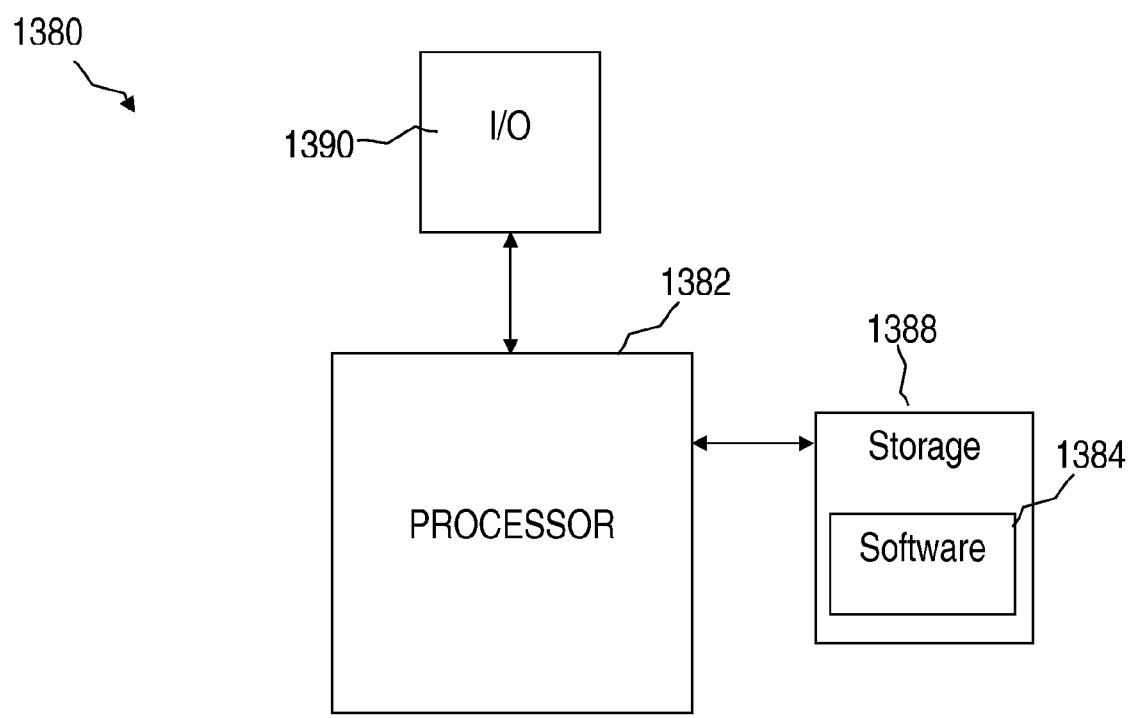
FIG. 13 illustrates a general purpose computer system suitable for implementing at least some embodiments.

The system described above may be implemented on any general-purpose computer with sufficient processing power, memory resources, and throughput capability to handle the necessary workload placed upon the computer. FIG. 13 illustrates a general-purpose computer system 1380 suitable for implementing one or more embodiments disclosed herein. The computer system 1380 includes a processor 1382 (which may be referred to as a central processor unit or CPU) that is in communication with memory devices including storage 1388, and input/output (I/O) 1390 devices. The processor may be implemented as one or more CPU chips.

In various embodiments, the storage 1388 comprises a computer readable medium such as volatile memory (e.g., RAM), non-volatile storage (e.g., Flash memory, hard disk drive, CD ROM, etc.), or combinations thereof. The storage 1388 comprises software 1384 that is executed by the processor 1382. One or more of the actions described herein are performed by the processor 1382 during execution of the software 1384.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the redirected requests need not enter the memory system of the host processor before modification if a separate network element performs the modification on-the-fly. Also, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

We claim:

1. A method comprising:
  a) creating a first stub file on a target file server, the first stub file created in a target directory, the first stub file pointing to source data in a source directory on a source file server;
  b) creating a t-stub file at a root location of the source directory, the t-stub file pointing to the target directory, the source directory allowing access to source data only when accessed due to the first stub file;
  c) disabling performance of operations on source data while allowing completion of operations in progress;
  wherein creating the first stub file comprises creating the first stub file on the target file server, the first stub file created in the target director, the first stub file pointing to the source data in the source directory on the source file server, the source data comprising a file, the file open for access.

2. The method of claim 1, further comprising
  d) copying source data into a hidden directory on the target file server, thus creating target data;
  e) overwriting the first stub file by renaming the target data;
  f) enabling performance of operations on the target data;
  g) performing queued operations on the target data; and
  h) deleting source data from the source file server.

3. The method of claim 2, further comprising replacing the t-stub file with a second stub file, the second stub file pointing to the target directory.

4. The method of claim 2, wherein the source data comprises multiple files, the multiple files open for access, a), c), d), e), f), g), and h) repeated for each file.

5. The method of claim 2, wherein the source data comprises multiple files, the multiple files open for access, a), c), d), e), f), g), and h) repeated for each file, the source data comprising a subdirectory.

6. The method of claim 2, wherein the source data comprises multiple files, the multiple files open for access, a), c), d), e), f), g), and h) repeated for each file, the source data comprising a subdirectory, a), c), d), e), f), g), and h) repeated using the subdirectory as the source directory.

7. The method of claim 5, wherein overwriting the first stub file comprises:
  deleting the first stub file; and
  renaming the target data such that the target data is accessible in the target directory.

8. The method of claim 1, wherein disabling performance of operations comprises:
  rescinding operations in progress that cannot be completed;
  sending a close request to the source data;
  intercepting access requests for the source data from a client; and
  intercepting updates to the source data from the client.

9. The method of claim 8, wherein disabling performance of operations further comprises:
  storing state information regarding the source data;
  storing lock information regarding the source data; and
  storing log information regarding the source data, the log information comprising the access requests and the updates.

10. The method of claim 9, wherein performing queued operations comprises:
  applying the state information to the target data;
  applying the lock information to the target data; and
  applying the log information to the target data.

11. The method of claim 10, wherein enabling performance of operations comprises reissuing rescinded operations.

12. The method of claim 11, wherein enabling performance of operations further comprises sending an open request to the target data.

13. A computer-readable medium storing a software program that, when executed by a processor, causes the processor to:
   a) create a first stub file on a target file server, the first stub file created in a target directory, the first stub file pointing to source data in a source directory on a source file server;
   b) create a t-stub file at a root location of the source directory, the t-stub file pointing to the target directory, the source directory allowing access to source data only when accessed due to the first stub file;
   c) disable performance of operations on source data while allowing completion of operations in progress;
   wherein creatin the first stub file causes the processor to create the first stub file on the target file server, the first stub file created in the target directory, the first stub file pointing to the source data in the source directory on the source file server, the source data comprising a file, the file open for access.

14. The computer-readable medium of claim 13, further causing the processor to
   d) copy source data into a hidden directory on the target file server, thus creating target data;
   e) overwrite the first stub file by renaming the target data;
   f) enable performance of operations on the target data;
   g) perform queued operations on the target data; and
   h) delete source data from the source file server.

15. The computer-readable medium of claim 14, further causing the processor replace the t-stub file with a second stub file, the second stub file pointing to the target directory.

16. The computer-readable medium of claim 14, wherein comprises multiple files, the multiple files open for access, a), c), d), e), f), g), and h) repeated for each file.

17. The computer-readable medium of claim 14, wherein the source data comprises multiple files, the multiple files open for access, a), c), d), e), f), g), and h) repeated for each file, the source data comprising a subdirectory.

18. The computer-readable medium of claim 17, wherein the source data comprises multiple files, the multiple files open for access, a), c), d), e), f), g), and h) repeated for each file, the source data comprising a subdirectory, a), c), d), e), f), g), and h) repeated using the subdirectory as the source directory.

19. The computer-readable medium of claim 17, wherein overwriting the first stub file causes the processor to:
   delete the first stub file; and
   rename the target data such that the target data is accessible in the target directory.

20. A computer-readable medium storing a software program that, when executed by a processor, causes the processor to:
   create a first stub file on a target file server, the first stub file created in a target directory, the first stub file pointing to source data in a source directory on a source file server;
   create a t-stub file at a root location of the source directory, the t-sub file pointing to the target directory, the source directory allowing access to source data only when accessed due to the first stub file;
   disable performance of lions on source data while allowing completion of operations in progress;
   rescind operations in progress that cannot be completed;
   send a close request to the source data;
   intercept access requests for the source data from a client; and
   intercept updates to the source data from the client.

21. The computer-readable medium of claim 20, wherein disabling operations on the source data further causes the processor to:
   store state information regarding the source data;
   store lock information regarding the source data; and
   store log information regarding the source data, the log information comprising the access requests and the updates.

22. The computer-readable medium of claim 21, wherein the software causes the processor to perform queued operations by causing the processor to:
   apply the state information to the target data;
   apply the lock information to the target data; and
   apply the log information to the target data.

23. The computer-readable medium of claim 22, wherein the software causes the processor to enable performance of operations by causing the processor to:
   reissue rescinded operations; and
   send an open request to the target data.

* * * * *